US008822078B2

(12) United States Patent
Landi et al.

(10) Patent No.: US 8,822,078 B2
(45) Date of Patent: Sep. 2, 2014

(54) FREESTANDING CARBON NANOTUBE PAPER, METHODS OF ITS MAKING, AND DEVICES CONTAINING THE SAME

(75) Inventors: Brian J. Landi, Rochester, NY (US); Ryne P. Raffaelle, Honeoye Falls, NY (US); Cory D. Cress, Alexandria, VA (US)

(73) Assignee: Rochester Institute of Technology, Rochester, NY (US)

(*) Notice: Subject to any disclaimer, the term of this patent is extended or adjusted under 35 U.S.C. 154(b) by 541 days.

(21) Appl. No.: 12/240,502

(22) Filed: Sep. 29, 2008

(65) Prior Publication Data
US 2010/0282496 A1 Nov. 11, 2010

(51) Int. Cl.
| | |
|---|---|
| H01M 4/583 | (2010.01) |
| H01M 6/04 | (2006.01) |
| H01M 6/18 | (2006.01) |
| H01B 5/00 | (2006.01) |
| B05D 5/12 | (2006.01) |
| B32B 9/04 | (2006.01) |
| B32B 5/00 | (2006.01) |
| H01G 11/36 | (2013.01) |
| H01M 4/587 | (2010.01) |
| H01M 4/90 | (2006.01) |
| H01M 10/0525 | (2010.01) |
| H01G 9/04 | (2006.01) |

(52) U.S. Cl.
CPC ............... *H01M 4/587* (2013.01); *H01G 11/36* (2013.01); *Y02E 60/13* (2013.01); *H01M 4/9083* (2013.01); *H01M 10/0525* (2013.01); *Y02E 60/50* (2013.01); *Y02E 60/122* (2013.01); *H01G 9/058* (2013.01); *Y10S 977/742* (2013.01); *Y10S 977/75* (2013.01); *Y10S 977/752* (2013.01); *Y10S 977/847* (2013.01)

USPC ........ 429/231.8; 429/188; 429/306; 429/532; 174/126.1; 427/113; 427/79; 428/408; 428/323; 977/742; 977/750; 977/752; 977/847

(58) Field of Classification Search
USPC ............... 429/231.8, 188, 306, 532; 174/133, 174/126.1; 427/113, 79; 428/323, 408; 977/742, 750, 752, 847
See application file for complete search history.

(56) References Cited

U.S. PATENT DOCUMENTS

| 6,334,939 B1 | 1/2002 | Zhou et al. |
| 6,436,576 B1 | 8/2002 | Hossain |

(Continued)

OTHER PUBLICATIONS

Zhang et al., "Composite anode material of silicon/graphite/carbon nanotubes for Li-ion batteries", Electrochimica Acta 51:4994-5000 (2006).*

(Continued)

*Primary Examiner* — Karie O'Neill Apicella
(74) *Attorney, Agent, or Firm* — Joseph M. Noto; Bond Schoeneck & King PLLC

(57) ABSTRACT

The present invention relates to freestanding carbon nanotube paper comprising purified carbon nanotubes, where the purified carbon nanotubes form the freestanding carbon nanotube paper and carbon microparticles embedded in and/or present on a surface of the carbon nanotube paper. The invention also relates to a lithium ion battery, capacitor, supercapacitor, battery/capacitor, and fuel cell containing the freestanding carbon nanotube paper as an electrode. Also disclosed is a method of making a freestanding carbon nanotube paper. This method involves providing purified carbon nanotubes, contacting the purified carbon nanotubes with an organic solvent under conditions effective to form a dispersion comprising the purified carbon nanotubes. The dispersion is formed into a carbon nanotube paper and carbon microparticles are incorporated with the purified carbon nanotubes.

27 Claims, 10 Drawing Sheets

(56) References Cited

U.S. PATENT DOCUMENTS

| | | | |
|---|---|---|---|
| 6,514,395 | B2 | 2/2003 | Zhou et al. |
| 6,596,441 | B1 | 7/2003 | Green et al. |
| 6,752,977 | B2 | 6/2004 | Smalley et al. |
| 6,783,702 | B2 | 8/2004 | Niu et al. |
| 6,790,425 | B1 | 9/2004 | Smalley et al. |
| 6,863,942 | B2 | 3/2005 | Ren et al. |
| 6,890,685 | B2 | 5/2005 | Yamamoto et al. |
| 6,936,233 | B2 | 8/2005 | Smalley et al. |
| 7,008,604 | B2 | 3/2006 | Smalley et al. |
| 7,029,794 | B2 | 4/2006 | Ogura et al. |
| 7,060,390 | B2 | 6/2006 | Chen et al. |
| 2002/0015848 | A1* | 2/2002 | Kobayashi ............. 428/402 |
| 2004/0197638 | A1 | 10/2004 | McElrath et al. |
| 2006/0068282 | A1* | 3/2006 | Kishi et al. ............. 429/188 |
| 2007/0202403 | A1* | 8/2007 | Oh et al. ............... 429/217 |

OTHER PUBLICATIONS

Ng et al., "Single wall carbon nanotube paper as anode for lithium-ion battery", Electrochimica Acta 51:23-8 (2005).*

International Search Report for International Patent Application No. PCT/US09/58572 (Jan. 25, 2010).

Ng et al., "Single Wall Carbon Nanotube Paper as Anode for Lithium-Ion Battery," Electrochimica Acta 51:23-8 (2005).

Wang et al., "Highly Oriented Carbon Nanotube Papers Made of Aligned Carbon Nanotubes," Nanotechnology 19 (075609):1-6 (2008).

Written Opinion of the International Searching Authority for International Patent Application No. PCT/US09/58572 (Jan. 25, 2010).

Eom et al., "Electrochemical Insertion of Lithium Into Multiwalled Carbon Nanotube/Silicon Composites Produced by Ballmilling," Journal of the Electrochemical Society153(9):A1678-A1684 (2006).

Holzapfel et al., "Nano Silicon for Lithium-ion Batteries," Electrochimica Acta 52:973-8 (2006).

Kim et al., "Carbon Nanotubes (CNTs) as a Buffer Layer in Silicon/CNTs Composite Electrodes for Lithium Secondary Batteries," Journal of Power Sources 162:1275-81 (2006).

Landi et al., "Effects of Alkyl Amide Solvents on the Dispersion of Single-Wall Carbon Nanotubes," J. Phys. Chem. B. 108:17089-95 (2004).

Landi et al., "Purity Assessment of Single-Wall Carbon Nanotubes, Using Optical Absorption Spectroscopy," J. Phys. Chem. B. 109:9952-65 (2005).

Landi et al., "Thermal Oxidation Profiling of Single-Walled Carbon Nanotubes," Chem. Mater. 17:6819-34 (2005).

Raffaelle et al., "Carbon Nanotubes for Power Applications," Materials Science and Engineering B 116:233-43 (2005).

Zhang et al., "Composite Anode Material of Silicon/Graphite/Carbon Nanotubes for Li-ion Batteries," Electrochimica Acta 51:4994-5000 (2006).

* cited by examiner

FREESTANDING CARBON NANOTUBE PAPER, METHODS OF ITS MAKING, AND DEVICES CONTAINING THE SAME

The subject matter of this application was made with support from the United States Government under grant number NRO000-06-C-0241. The United States Government has certain rights.

FIELD OF THE INVENTION

The present invention relates to freestanding carbon nanotube paper, methods of its making, and devices containing the same.

BACKGROUND OF THE INVENTION

Lithium-based battery cells are an attractive energy source for portable applications due in part to their ability to provide relatively high energies and long cycle life. Lithium is the lightest of all the metals, with a high electrochemical potential, thus providing high energy densities. Rechargeable batteries using lithium as the electrochemical material are capable of providing higher energy to weight ratios than those using other chemistries.

The higher voltage of lithium ion batteries yields a higher energy density for an equivalent energy capacity in other battery chemistries. The actual voltage within the battery depends on the choice of the anode and cathode couples used in the battery. High voltage cathode materials include, among others, $Li_xMnO_y$, $Li_xCoO_y$, and $Li_xNiO_y$. Of these, the nickel based material, particularly $LiNiO_2$, has the highest capacity, and as a result has become a focus area for the enhancement of lithium cell energy. While cells incorporating this material yield higher energy densities, the higher voltage of the cell leads to material instability that in turn results in poor cycle life characteristics.

The most widely used active material for positive electrodes for lithium ion secondary batteries is lithium-cobalt oxide. However, lithium-cobalt oxide electrodes require an expensive cobalt compound for raw material, increasing the cost of the positive electrode material, and resulting in the higher cost of the secondary battery. Thus, there is a need for an inexpensive substitute for the active material for positive electrodes.

Research is currently underway on lithium-metal oxides, where the metal is selected from manganese and nickel, as a replacement for the lithium-cobalt oxide. In particular, the lithium-nickel oxide manifests the same high voltage as the lithium-cobalt oxide, and has a theoretical capacity greater than that of the lithium-cobalt oxide, and the Ni raw material is less expensive than Co, and available in stable supply. In addition, lithium-nickel oxide electrodes have a higher charge capacity and discharge capacity, and improved cycle characteristics in comparison to lithium-cobalt oxide electrodes. However, lithium-nickel oxide electrodes have the following disadvantages: (i) discharge capacity is less in comparison to charge capacity; (ii) the irreversible capacity, or so called "retention" defined by the difference between the charge capacity and discharge capacity is considerable; and (iii) battery performance is comparatively easily degraded when used in high or low temperature environments.

To improve cycle characteristics, a different element (e.g., B, Al, In and Sn, or Li(Ni, Co)O$_2$ oxide) may be added for substitution in the lithium-nickel oxide. While this improves cycle characteristics, it also narrows the range within which intercalation-deintercalation of the lithium ions is obtained, and tends to reduce discharge capacity. This reduction in discharge capacity is known to be particularly apparent under conditions of high load at high discharge currents, and conditions of high efficiency discharge at low temperatures where lithium ion mobility in electrolyte is reduced at low temperatures.

Output characteristics of secondary batteries at low and/or high temperatures are important when the secondary batteries are installed in equipment used in environments in which temperature variation is large. In particular, if use in cold regions is considered, the secondary batteries must have sufficient output characteristics required at low temperature. Improvement in the output characteristics at low temperature is therefore an important consideration when the lithium ion secondary batteries with lithium-nickel oxide are installed in e.g., motor vehicles.

Carbon-based materials such as crystalline graphite with high crystallinity are used for negative electrodes in lithium-ion batteries. This type of graphite has a layered structure, and lithium ions are intercalated from the edge of the layered graphite to the interstitials sites of graphite layers during charging of a secondary battery, thereby producing a Li-graphite intercalation compound.

When graphite is used as a negative active material to prepare a negative electrode, the planes of the graphite layers are parallel to the plane of the collector, since most graphite is flake-shaped. Therefore, the edges of the graphite layers are aligned in a direction perpendicular to the positive electrode and, therefore, lithium ions which are deintercalated from the positive electrode cannot easily intercalate to the graphite layers during charging. In particular, when a battery is charged at a high rate, lithium ions are insufficiently intercalated to the graphite layers and discharge characteristics consequently deteriorate.

Electrical resistivity of a graphite-containing composition in the inner plane direction of a graphite layer (an (ab) plane or a (002) plane) is about 1000 times that of the plane direction of the graphite layer. Therefore, if the alignment of graphite can be controlled, anisotropy of graphite may decrease or it may be eliminated, and the graphite can be used in electronic appliances as well as in batteries. However, for a lithium ion battery with a carbonous (graphite) anode, the theoretical amount of lithium which can be intercalated by the anode is only an amount of one Li atom per 6 carbon atoms. Thus, when the amount of lithium intercalated by the anode is made to be greater than the theoretical amount upon charging or when charging is performed under condition of high electric current density, there will be an unavoidable problem of lithium deposition in a dendritic state (that is, in the form of a dendrite) on the surface of the anode. This will result in causing internal-shorts between the anode and the cathode upon repeating the charge-and-discharge cycle. Therefore, it is difficult for the lithium ion battery with the carbonous (i.e., graphite) anode to achieve a high capacity.

Rechargeable lithium batteries in which metallic lithium is used as the anode have been proposed. Metallic lithium electrodes exhibit a high energy density. However, the charge-and-discharge cycle life is extremely short because the metallic lithium reacts with impurities such as moisture and organic solvents present in the electrolyte solution and form an insulating film. In addition, the metallic lithium anode has an irregular surface with portions to which electric field is converged. These factors lead to generating a dendrite of lithium upon repeating the charge-and-discharge cycle, resulting in internal-shorts between the anode and cathode. As a result, the charge-and-discharge cycle life of the rechargeable battery is extremely shortened. A lithium-aluminum alloy has been used in an attempt to eliminate the problems of the metallic lithium. However, because the lithium alloy is hard it is difficult to produce a spiral-wound cylindrical rechargeable battery.

Thus, there is a need for new materials for electrodes that can improve electrode performance and, in particular, the charge-and-discharge cycle of lithium ion batteries. The present invention is directed to overcoming these and other limitations in the art.

SUMMARY OF THE INVENTION

A first aspect of the present invention is directed to a freestanding carbon nanotube paper comprising purified carbon nanotubes, where the purified carbon nanotubes form the freestanding carbon nanotube paper, and carbon microparticles embedded in and/or present on a surface of the carbon nanotube paper.

A second aspect of the present invention is directed to a lithium ion battery containing the carbon nanotube paper according to the first aspect of the present invention, where the carbon nanotube paper is present as at least one electrode in the lithium ion battery.

A third aspect of the present invention is directed to a capacitor, supercapacitor, or battery/capacitor containing the carbon nanotube paper according to the first aspect of the present invention, where the carbon nanotube paper is present as at least one electrode in the capacitor, supercapacitor, or battery/capacitor.

A fourth aspect of the present invention is directed to a fuel cell containing the carbon nanotube paper according to the first aspect of the present invention, where the carbon nanotube paper is present as at least one catalyst layer in the fuel cell.

A fifth aspect of the present invention is directed to a method of making a freestanding carbon nanotube paper. This method involves providing purified carbon nanotubes. The purified carbon nanotubes are contacted with an organic solvent under conditions effective to form a dispersion comprising the purified carbon nanotubes. The dispersion is formed into a carbon nanotube paper. Carbon microparticles are incorporated with the purified carbon nanotubes.

Conventional lithium ion batteries employ composite electrodes deposited on metal foils. In the case of the anode, the graphitic carbon is mixed with a binder and conductive additive before depositing on a copper foil. While attempts to thin the copper foil prove useful in improving the overall usable capacity, there are limitations. As shown in FIG. 1, the effective electrode capacity significantly varies with the thickness of the anode composite based on simple mass averaging considerations. Similarly, the metal foil also influences the effective electrode capacity, as shown for 10, 15, and 20 µm copper foil thicknesses. Although the specific capacity of the graphitic carbon is typically 300 mAh/g, the effect of using a composite anode reduces the effective capacity initially to 240 mAh/g. The subsequent deposition onto copper foil can reduce the effective capacity by 50% for 100 µm thick composites and >80% for 25 µm thick composites. This is an important consideration as the high power batteries being produced today rely on this "active layer thinning" strategy to increase the charge-discharge rates, but at a severe cost to the total energy density in the battery.

The prospect of a freestanding electrode can obviate these concerns while maintaining the full usable capacity of the active material. As shown in FIG. 1, the enhancement for a freestanding electrode (capacity of 300 mAh/g) compared to a graphite based anode composite (80:10:10 mass ratio of active anode material:polymer binder:conductive additive) deposited on a 10 µm copper foil would vary from a 100% increase in electrode specific capacity for high energy density batteries (i.e., active layer of 100 µm) to a 275% increase in electrode specific capacity for high power density batteries (i.e., active layer of 25 µm).

Recently, the impact of freestanding electrodes was demonstrated using purified single wall carbon nanotube ("SWCNT") electrodes. The purified SWCNT papers were freestanding: not requiring binder or a copper substrate. The measured lithium ion capacity for 25 µm SWCNT paper electrodes was as high as 520 mAh/g, which is a 10× improvement in effective lithium ion capacity compared to graphitic composite electrodes on copper foil. The enhancement in lithium ion specific capacity for SWCNT papers is expected due to the superior electrical conductivity (Thess et al., "Crystalline Ropes of Metallic Carbon Nanotubes," *Science* 273: 483-487 (1996), which is hereby incorporated by reference in its entirety) and high aspect ratio of a nanotube in the interpenetrating porous network. In addition, there are potential advantages to SWCNT paper electrodes based upon their thermal conductivity (Berber et al., "Unusually High Thermal Conductivity of Carbon Nanotubes," *Phys. Rev. Lett.* 84:4613-4616 (2000), which is hereby incorporated by reference in its entirety) which would allow for effective heat dissipation that can enhance the safety over composite electrodes. The mechanical properties of SWCNT papers exhibit both strength and flexibility (Zhang et al., "Properties and Structure of Nitric Acid Oxidized Single Wall Carbon Nanotube Films," *J. Phys. Chem. B* 108:16435-16440 (2004), which is hereby incorporated by reference in its entirety), which are attractive features to prevent cracking during operation or in vibration environments.

Although the total lithium ion capacity of high purity SWCNT electrodes is roughly 2× the total capacity of graphitic carbons like mesocarbon microbeads ("MCMB") (i.e. 520 mAh/g vs. 300 mAh/g), the insertion/extraction voltage profiles are uniquely different. The well-known voltage profile for lithium ion insertion/extraction (i.e., staging) in MCMB is at voltages between 0.1-0.25 V (V vs. $Li/Li^+$), whereas the SWCNT electrodes have a smoothly varying voltage profile, with less defined staging. This effect of staging can dramatically influence the overall voltage profile in a full battery when using conventional cathode materials. Therefore, the proper combination of MCMB lithium ion staging properties with the extraordinary SWCNT physical properties into a freestanding electrode would be a novel anode solution for lithium ion batteries.

High purity SWCNTs were prepared using an alexandrite laser vaporization. Details of the synthesis and purification have been described previously (Landi et al., "Thermal Oxidation Profiling of Single-Walled Carbon Nanotubes," *Chem. Mater.* 17:6819-6834 (2005); Landi et al., "Effects of Carrier Gas Dynamics on Single Wall Carbon Nanotube Chiral Distributions During Laser Vaporization Synthesis," *J. Nanosci. & Nanotech.* 7:883-890 (2007); Landi et al., "Purity Assessment of Single Wall Carbon Nanotubes Using Optical Absorption Spectroscopy," *J. Phys. Chem. B* 109:9952-9965 (2005); Landi et al., "Effects of Alkyl Amide Solvents on the Dispersion of Single Wall Carbon Nanotubes," *J. Phys. Chem. B* 108:17089-17095 (2004), which are hereby incorporated by reference in their entirety). The freestanding carbon nanotube paper of the present invention was prepared using a gradient of purified SWCNTs followed by a weighted blend of purified SWCNTs with particular mass ratios to the MCMBs (Osaka Gas). The weighted blends (w/w) prepared initially were 90:10, 75:25, and 50:50 with MCMB:

SWCNTs, respectively. The MCMBs that were evaluated in the prototype measurement were particles 10-28, although the 6-28, 25-28, and various combinations of these may improve performance.

BRIEF DESCRIPTION OF THE DRAWINGS

In FIG. 5A, from left: $LiCoO_2$:PVDF composite on aluminum can with polymer o-ring, Celgard 2325 separator, MCMB-SWCNT electrode paper (binder free) on metal lid. FIG. 5B is a graph showing a charge-discharge curve for a freestanding MCMB-SWCNT/$LiCoO_2$ secondary Li-ion battery.

DETAILED DESCRIPTION OF THE INVENTION

Figure 1:
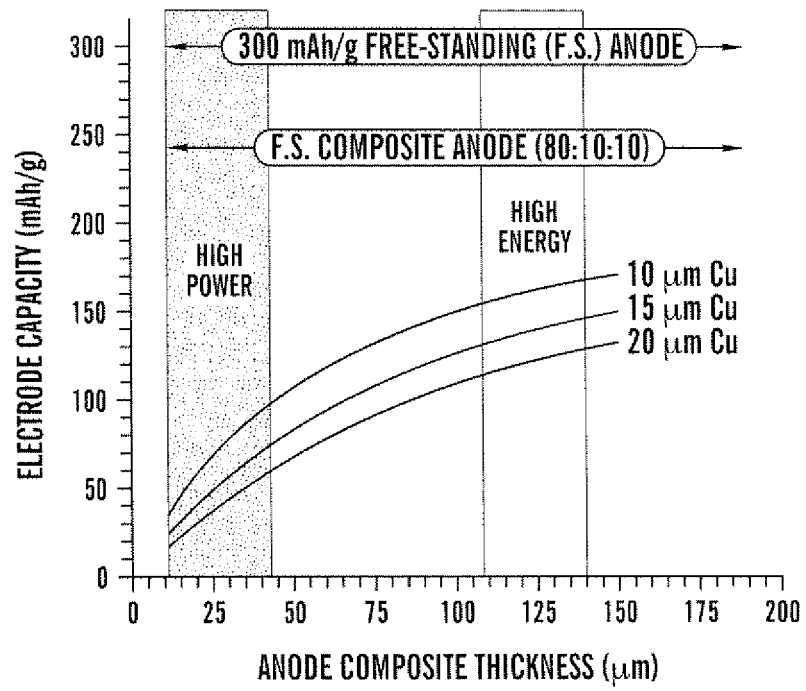
FIG. 1 is a graph showing theoretical anode electrode specific charge capacity as a function of active material thickness for electrodes formed from freestanding carbon nanotube papers of the present invention (top arrow, 300 mAh/g), 80:10:10 composite blend (second arrow, 240 mAh/g), and for 80:10:10 composite blends deposited on copper foil substrates with thicknesses of 10, 15, and 20 µm.

The present invention is directed to freestanding carbon nanotube paper, methods of making the freestanding carbon nanotube paper, and use thereof as electrodes in electrochemical power generation and storage devices including, without limitation, lithium ion batteries, capacitors, supercapacitors, batteries/capacitors, solar cells, and fuel cells.

The freestanding carbon nanotube paper of the present invention is characterized by purified carbon nanotubes, where the purified carbon nanotubes form the freestanding carbon nanotube paper, and carbon microparticles embedded in and/or present on a surface of the carbon nanotube paper.

Carbon nanotubes may be obtained in a variety of forms of nanostructured carbon including, without limitation, as single wall carbon nanotubes, double wall carbon nanotubes, multi-wall carbon nanotubes, or mixtures thereof. Carbon nanotubes can be obtained commercially or prepared by a variety of synthetic routes known and practiced by those of ordinary skill in the art.

The synthesis of carbon nanotubes can be accomplished in a wide variety of methods that involve the catalytic decomposition of a carbon containing gas or solid. Some of the most common techniques for the synthesis of carbon nanotubes are chemical vapor deposition, arc-discharge, and laser vaporization synthesis. The synthesis conditions (e.g., temperature, pressure, carrier gas, etc.), metal catalyst type (most commonly iron, nickel, cobalt, or yttrium), and carbon source (graphite or hydrocarbon) have all been shown to influence the properties of the resulting carbon materials.

For purposes of the present invention, carbon nanotubes may contain two or more forms of nanostructured carbon. For example, SWCNTs may be combined with amorphous nanostructured carbon to form a dispersion. It may be desirable to combine SWCNTs made in a synthesis reactor with a metal catalyst with amorphous nanostructured carbon made in the same reactor without the metal catalyst. It may also be desirable to disperse carbon nanotubes in more than one form in predetermined mass ratios.

As used herein, "purified" carbon nanotubes refers to at least 75% w/w purity or, more preferably, at least 85% w/w purity or, most preferably, at least 95% w/w purity. Purifying carbon nanotubes and determining purity levels can be carried out according to methods and procedures described in U.S. Patent Application Publication No. 2008/0008643, which is hereby incorporated by reference in its entirety. Purification of carbon nanotubes is also discussed in Landi et al., "Thermal Oxidation Profiling of Single-Walled Carbon Nanotubes," *Chem. Mater.* 17:6819-6834 (2005), which is hereby incorporated by reference in its entirety.

Carbon microparticles include particles of carbon having a diameter of about 1-50 µm. Suitable carbon microparticle materials include graphite, flake graphite, spherical graphite, expanded graphite, and mesocarbon microbeads, although other carbon microparticles may also be used.

According to one embodiment of the present invention, carbon microparticles are embedded in the carbon nanotube paper. Embedded microparticles may include, for example, microparticles wrapped in carbon nanotubes either completely or partially. Alternatively, the carbon microparticles are present on a surface of the carbon nanotube paper.

The carbon nanotube paper of the present invention may include semiconductor nanoparticles present with the purified carbon nanotubes and the carbon microparticles. Suitable nanoparticles include, without limitation, nanoparticles selected from compositions containing Si, Ge, GaSb, InSb, SnSe, SnTe, GaP, GaAs, InAs, $TiO_2$, InP, AlP, AlAs, ZnTe, CdSe, CdTe, and mixtures or alloys thereof. The nanoparticles preferably have a critical dimension of less than about 1 µm or, more preferably, less than about 500 nm or, more preferably, less than about 250 nm or, most preferably, about 1-50 nm. The nanoparticles may have a three-dimensional geometric shape that is spherical, cubic, rod, oligo-pod, pyramidal, or highly branched.

Semiconductor nanoparticles may be incorporated with the purified carbon nanotube paper of the present invention in amounts of about 1% w/w or, more preferably, at least about 10% w/w or, most preferably, at least about 25% w/w semiconductor nanoparticles to purified carbon nanotubes and carbon microparticles.

The freestanding carbon nanotube paper of the present invention may have a weight ratio of purified carbon nanotubes to carbon microparticles that varies according to the particular application or use. The weight ratio of purified carbon nanotubes to carbon microparticles may be at about 0.01:1-100:1, about 0.02:1-50:1, about 0.05:1-20:1, about 0.1:1-10:1, about 0.2:1-5:1, about 0.5:1-2:1, or about 1:1, preferably about 0.05:1-20:1 or about 0.1:1-10:1.

The freestanding carbon nanotube paper has a density of less than about 1.5 g/cm$^3$.

With respect to thermal stability, the carbon nanotube paper according to the present invention has a thermal stability that exceeds at least about 600° C.

The freestanding carbon nanotube paper according to the present invention may contain a polymeric binder. Suitable polymeric binders include, without limitation, polyvinylidene difluoride, poly(acrylonitrile)-(PAN), Nafion, polyaniline, poly(ethylene oxide), poly(ethylene glycol), polypropylene glycol), polyacrylamide, nylon-6, and other similar polymeric binders or mixtures thereof.

Formulations of the freestanding carbon nanotube paper of the present invention can vary according to their intended use. In one embodiment, the structure may be formulated with less than about 40% w/w polymer binder or, more preferably, less than about 30% w/w polymer binder, or most preferably, less than about 20% w/w polymer binder. In one embodiment, the freestanding carbon nanotube paper of the present invention has less than about 5% w/w polymer binder or, more preferably, no polymer binder at all.

The carbon nanotube paper according to the present invention is freestanding. "Freestanding" structures are separable from a support structure i.e., the carbon nanotube paper is not dependent upon another structure for support in its use e.g., as an electrode. In an alternative embodiment, the carbon nanotube paper according to the present invention may be used in conjunction with structures that behave as support structures.

The freestanding carbon nanotube paper of the present invention may have a thickness from about 1 μm to about 500 μm or, preferably, about 1-100 μm, about 100-200 μm, about 200-300 μm, about 300-400 μm, or about 400-500 μm.

The freestanding carbon nanotube paper of the present invention can be made by providing purified carbon nanotubes and contacting the purified carbon nanotubes with an organic solvent under conditions effective to form a dispersion comprising the purified carbon nanotubes. The dispersion is formed into a carbon nanotube paper. Carbon nanoparticles are incorporated with the purified carbon nanotubes.

Pursuant to this method, forming the dispersion may be carried out by membrane filtration using a vacuum or pressurized system, or any other suitable method. Dispersions of carbon nanotubes can be prepared using batch ultrasonication, mechanical stirring, horn tip ultrasonication, and other methods effective to homogeneously stabilize carbon nanotubes in solution.

In the methods of making freestanding carbon nanotube paper according to the present invention, contacting purified carbon nanotubes with an organic solvent under conditions effective to form a dispersion comprising the purified carbon nanotubes involves rendering the purified carbon nanotubes mobile in solution under specific conditions. Preferably, two electrodes are placed opposite each other in a container that also contains the carbon nanotube dispersion. An electric field is then applied between the electrodes. The carbon nanotubes will migrate in the solution to one or both electrodes after sufficient time according to solvent properties (i.e., dielectric constant) and solution temperature. Methods of preparing dispersions of carbon nanotubes are described in U.S. Patent Application Publication No. 2008/0008643, which is hereby incorporated by reference in its entirety.

Suitable organic solvents for dispersing the purified carbon nanotubes include, without limitation, alkyl amide solvents, preferably N,N-dimethylacetamide, 1-2 dichlorobenzene, and 1-chloronaphthalene. Suitable alkyl amide solvents for dispersing purified carbon nanotubes and other nanostructured carbon are described in U.S. Patent Application Publication No. 2008/0008643, which is hereby incorporated by reference in its entirety.

Incorporating the carbon microparticles with the purified carbon nanotubes may be carried out by introducing the carbon microparticles into the dispersion prior to forming the dispersion into a carbon nanotube paper or, alternatively, the incorporating step is carried out after forming the dispersion into a carbon nanotube paper by introducing the carbon microparticles into or onto the carbon nanotube paper.

When carbon microparticles are incorporated with the purified carbon nanotubes at the dispersion stage, suitable methods include, without limitation, mixing, electrolytic deposition, and chemical attachment (e.g., covalent, noncovalent, and/or electrostatic). Alternatively, when carbon microparticles are incorporated with the purified carbon nanotubes after formation of the purified carbon nanotubes into a paper, suitable methods may include, without limitation, thermal deposition, sputter deposition, pulsed laser deposition, electro-deposition (electro-plating), or electroless deposition.

Semiconductor nanoparticles can be optionally incorporated with the purified carbon nanotubes at either the dispersion stage or after the purified carbon nanotubes have been formed into a paper. When semiconductor nanoparticles are incorporated with the purified carbon nanotubes at the dispersion stage, suitable methods include, without limitation, mixing, electrolytic deposition, and chemical attachment (e.g., covalent, noncovalent, and/or electrostatic). Alternatively, when semiconductor nanoparticles are incorporated with the purified carbon nanotubes after formation of the purified carbon nanotubes into a carbon nanotube paper, suitable methods may include, without limitation, thermal deposition, sputter deposition, pulsed laser deposition, electro-deposition (electro-plating), or electroless deposition.

In carrying out the methods of the present invention, it may be desirable to incorporate a polymeric binder into the dispersed purified carbon nanotubes. The polymer is incorporated during the dispersion process at a concentration effective to homogenously bind the carbon nanotube components together forming a contiguous film.

Formation of the dispersion containing purified carbon nanotubes (and, optionally, carbon microparticles and/or semiconductor nanoparticles) into a freestanding carbon nanotube paper is preferably carried out by vacuum filtration, a procedure familiar to those of skill in the art. Deposition of carbon microparticles onto a carbon nanotube paper can also be performed using conventional vacuum deposition methods including, but not limited to, chemical vapor deposition, physical vapor or thermal deposition, cathodic arc deposition, ion sputtering, and ion beam assisted deposition (IBAD). A method which requires less vacuum is jet vapor deposition. Because the materials are deposited in vacuum (typically less than 13.3 mPa, or $1\times10^{-4}$ torr), contamination can be minimized while maintaining good control over thickness and uniformity. The present invention makes use of these and other vacuum deposition techniques.

The formed carbon nanotube paper can be dried. Suitable drying methods are preferably carried out at a temperature sufficient to remove any solvent residue during processing (e.g., heated drying, vacuum drying, heated vacuum drying), but not beyond the stable melting point of the carbon nanotubes. Preferred drying conditions include a temperature of approximately 100° C. in vacuo.

The overall dimension (i.e., size) of the freestanding carbon nanotube paper may vary depending on its particular use. For example, as explained in more detail below, the freestanding carbon nanotube paper may be used in a lithium ion battery, capacitor, supercapacitor, battery/capacitor, fuel cell, or in conjunction with a photovoltaic cell.

Accordingly, a further aspect of the present invention relates to a lithium ion battery containing the carbon nanotube paper of the present invention, where the carbon nanotube paper is present as at least one electrode in the lithium ion battery.

Lithium-ion batteries include a positive current collector having an active material provided thereon and a negative current collector having an active material provided thereon. Together the positive current collector and the active material provided thereon are referred to as a positive electrode, while the negative current collector and the active material provided thereon are referred to as a negative electrode.

Figure 9:
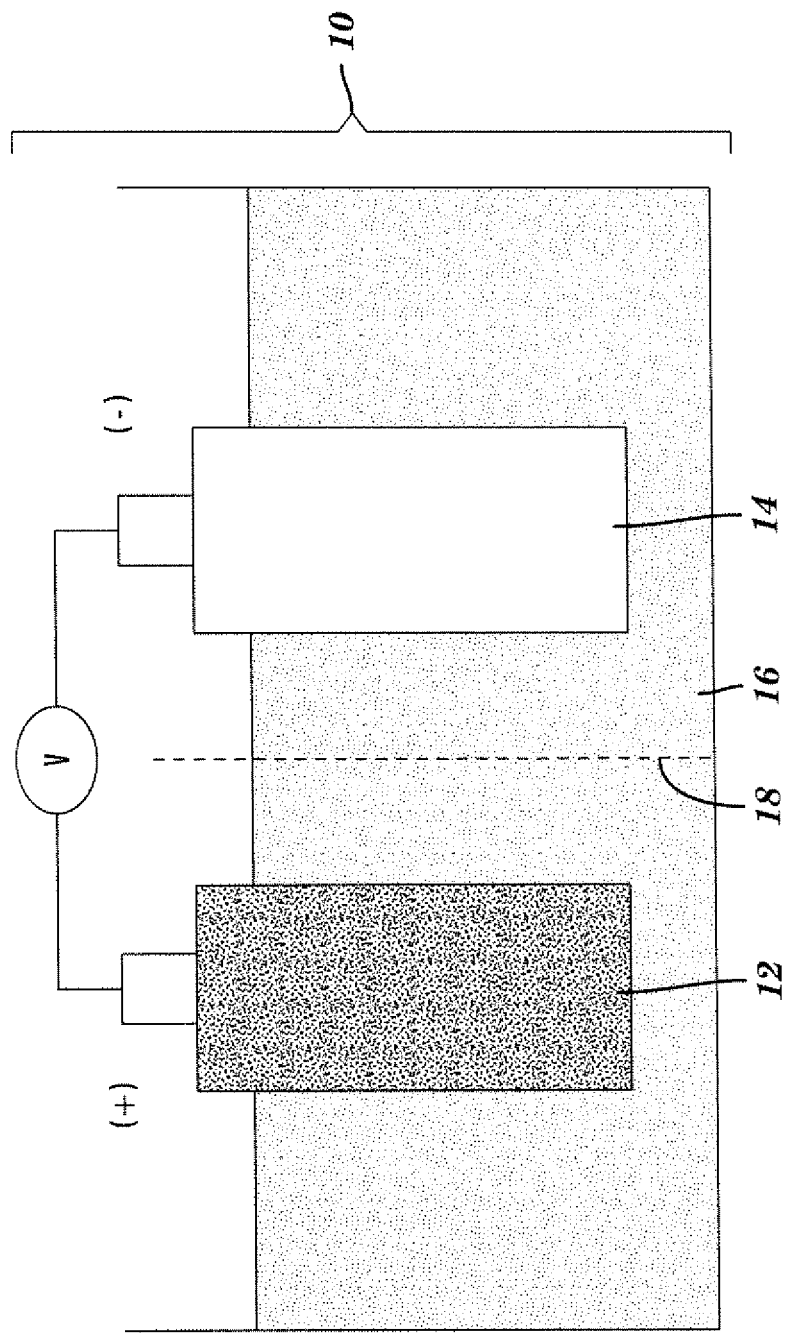
FIG. 9 illustrates one embodiment of a lithium ion battery that can incorporate a freestanding carbon nanotube paper according to the present invention as one or both of the electrodes.

FIG. 9 illustrates one embodiment of a portion of lithium-ion battery. Battery 10 includes positive electrode 12, negative electrode 14, an electrolyte material 16, and separator 18 (e.g., a polymeric microporous separator) provided intermediate or between positive electrode 12 and negative electrode 14. Electrodes 12 and 14 may be provided as relatively flat or planar plates or may be wrapped or wound in a spiral or other configuration (e.g., an oval, prismatic, or jellyroll configuration). Electrodes 12 and 14 may also be provided in a folded configuration. In a preferred embodiment, one or both of electrodes 12 and 14 are formed from the carbon nanotube paper according to the present invention and are in the form of a freestanding electrode support.

Electrolyte material 16 may be liquid or solid. Suitable liquid and solid electrolytes are known in the art. For example, liquid electrolyte material includes solid lithium-salt electrolytes, such as $LiPF_6$, $LiBF_4$, or $LiClO_4$, held in an organic solvent, such as ether, ethylene carbonate, propylene carbonate, or dimethyl carbonate, diethyl carbonate, dipropyl carbonate, and ionic liquids. In contrast, for solid electrolyte material, lithium-salt electrolyte is held in a solid polymer composite such as polyethylene oxide or polyacrylonitrile.

The lithium ion battery of the present invention is particularly suited for an ionic liquid electrolyte material. Examples of suitable ionic liquid electrolytes include, without limitation, 1-R-3-R'-imidazolium tetrafluoroborate, 1-R-3-R'-imidazolium hexafluorophosphate, 1-R-1-R'-pyrrolidinium bis(trifluoromethylsulfonyl)imide, and 1-R-3-R'-imidazolium bis(trifluoromethylsulfonyl)imide.

During charging and discharging of battery 10, lithium ions move between positive electrode 12 and negative electrode 14. For example, when battery 10 is discharged, lithium ions flow from negative electrode 14 to positive electrode 12. In contrast, when battery 10 is charged, lithium ions flow from positive electrode 12 to negative electrode 14.

The lithium ion battery of the present invention containing the carbon nanotube paper can be functional at temperatures equal to that of the thermal stability of the carbon nanotube paper.

Yet another aspect of the present invention relates to a capacitor, supercapacitor, or battery/capacitor containing the nano-composite structure of the present invention.

When a DC voltage is applied to a pair of electrodes that are immersed in an ion-containing electrolyte, it causes migration of different species of ions in the electrostatic field near the electrode interface where a space charge layer forms. This space charge layer is termed the electric double layer. The device is called an electric double layer capacitor because it works on the principle of charge storage in this charged layer.

Figure 10:
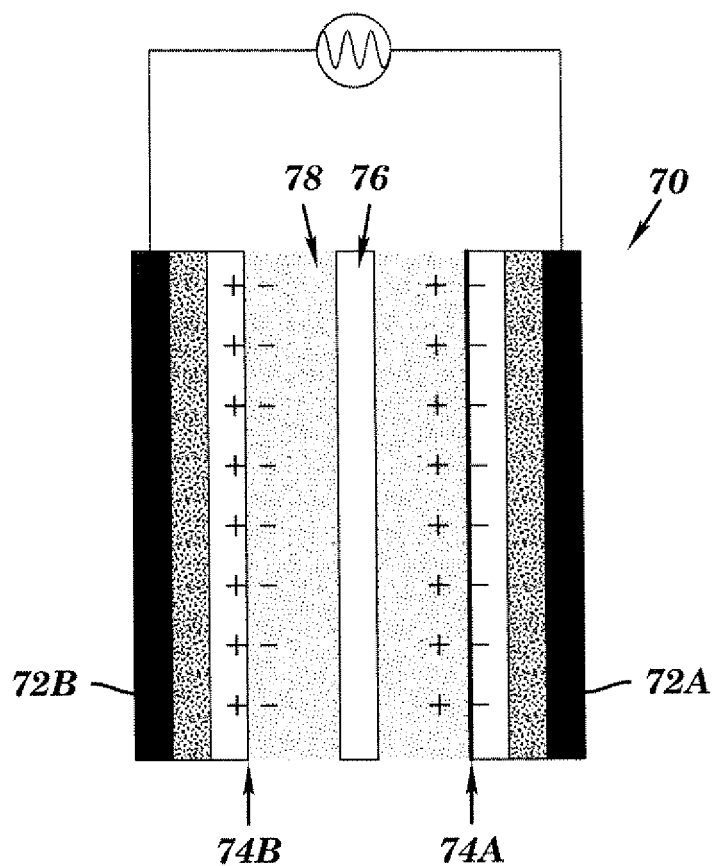
FIG. 10 illustrates one embodiment of a capacitor containing freestanding carbon nanotube papers according to the present invention as electrodes.

Referring to FIG. 10, capacitor 70 has electrodes 72A and 72B, electric double layers 74A and 74B, separator 76, and electrolyte solution 78. The structure of capacitor 70 is nearly identical to that of a battery differing only in terms of the materials used for negative and positive electrodes 72A and 72B, and the make up of electrolyte solution 78. According to one embodiment, both electrodes 72A and 72B are formed from freestanding carbon nanotube paper according to the present invention, with separator 76 being formed from a polymer (e.g., Teflon).

Any suitable electrolyte solution can be used. Exemplary electrolytes include, without limitation, aqueous solutions of KOH, $HNO_3$, HCl, tetraethylammonium bis(oxaloato)borate (TEABOB), tetraethylammonium tetrafluoroborate ($TEABF_4$), or triethylmethylammonium tetraflouraborate dissolved in acetonitrile (solvent).

The freestanding carbon nanotube paper of the present invention can be used as electrodes in a double layer capacitor where a charged double layer exists at the electrode interface. Thus, referring to FIG. 10, freestanding carbon nanotube paper electrodes 72A and 72B are in contact with electrolyte solution 78 which provides the ions for formation of opposite charges across an electrode-electrolyte interface. This charge separation acts like a parallel plate capacitor.

Still another aspect of the present invention relates to a fuel cell containing the freestanding carbon nanotube paper of the present invention.

Figure 11:
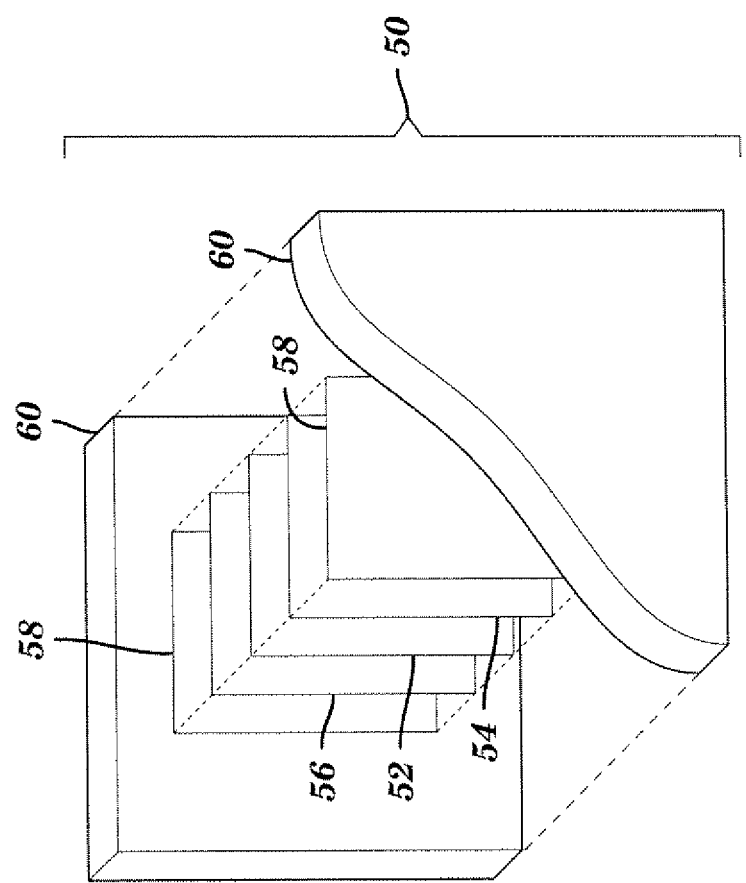
FIG. 11 illustrates one embodiment of a fuel cell containing a seven-layer membrane electrode assembly ("MEA"). The sealing gasket and gas diffusion layers are shown together to simplify the illustration. One or both of the electrodes include a freestanding carbon nanotube paper of the present invention as catalyst.

FIG. 11 illustrates the basic construction of a proton exchange membrane ("PEM") fuel cell that can incorporate the freestanding carbon nanotube paper of the present invention. Seven layer MEA 50 includes a central proton exchange membrane 52 flanked on opposite sides by an anode catalyst layer 54 and a cathode catalyst layer 56, all of which are sandwiched between a pair of gas diffusion layers/current collectors that are sealed with a gasket, collectively denoted 58. The MEA is positioned between a pair of end plates 60, one of which directs the flow of hydrogen over the anode catalyst, and the other of which directs the flow of oxygen (air) over the cathode catalyst and concomitant removal of water therefrom. The end plates are provided with channels through which the fluids flow.

According to one embodiment, both the anode and cathode catalyst layers are formed using the freestanding carbon nanotube paper of the present invention.

In another embodiment, the cathode catalyst layer is formed using the freestanding carbon nanotube paper of the present invention and the anode catalyst layer includes any other conventional catalyst material suitable for use as the anode.

Any suitable gas diffusion layer ("GDL") can be employed in the MEA. Known GDLs include, without limitation, waterproofed carbon paper coated with a hydrophilic diffusion layer (for anode side) or hydrophobic diffusion layer (for cathode side). Conventional coating materials include PTFE and TEFLON®.

The end plates are typically formed of machined aluminum or stainless steel, although for purposes of reducing the weight of the overall fuel cell stack, polymer materials can also be used. For example, end plates formed of FORTRON® polyphenylene sulfide (PPS) or CELSTRAN® PPS-glass fiber (GF) are available from Celanese AG (Dallas, Tex.). These materials satisfy the requirements of structural rigidity even at temperatures well in excess of the operating temperatures of the fuel cell.

Although a seven-layer MEA is illustrated in FIG. 11, it should be appreciated that any MEA design can be fabricated using the electrode of the present invention.

In a preferred embodiment of the present invention, the catalyst layer, gas diffusion layer, and current collector are combined into a single layer made of the freestanding carbon nanotube paper of the present invention.

Another aspect of the present invention is directed to a conducting wire or ribbon containing the carbon nanotube paper of the present invention. According to this aspect of the present invention, the carbon nanotube paper of the present invention is modified into a form factor that includes a wire or ribbon while maintaining the physical properties of the paper, such as the high conductivity (both electrical and thermal).

EXAMPLES

The Examples set forth below are for illustrative purposes only and are not intended to limit, in any way, the scope of the present invention.

Example 1

Freestanding Carbon Nanotube Paper

High purity SWCNTs were prepared using alexandrite laser vaporization, according to synthesis and purification methods described previously (Landi et al., Chem. Mater. 17:6819-6834 (2005); Landi et al., J. Nanosci. & Nanotech. 7:883-890 (2007); Landi et al., J. Phys. Chem. B 109:9952-9965 (2005); Landi et al., J. Phys. Chem. B 108:17089-17095 (2004), which are hereby incorporate by reference in their entirety).

Figure 2:
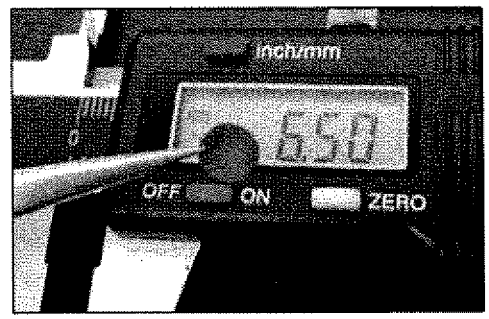
FIG. 2 is an image of a freestanding carbon nanotube paper forming a 1 cm² electrode from a 75:25 (MCMB:SWCNT) blend.
Figure 3A:
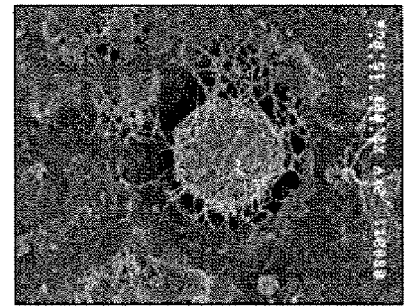
FIGS. 3A-H are scanning electron micrograph images of the sample shown in FIG. 2.
Figure 3B:
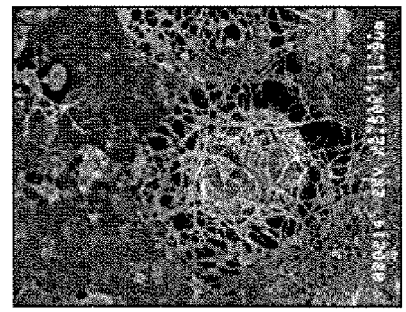
Figure 3C:
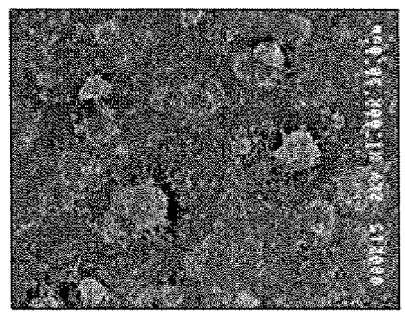
Figure 3D:
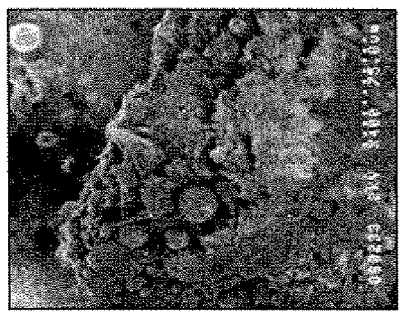
Figure 3E:
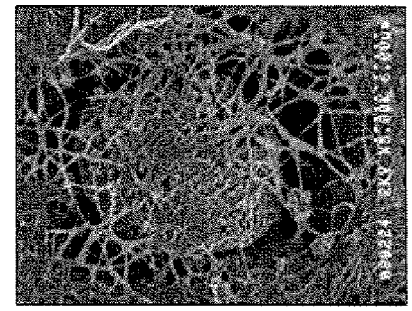
Figure 3F:
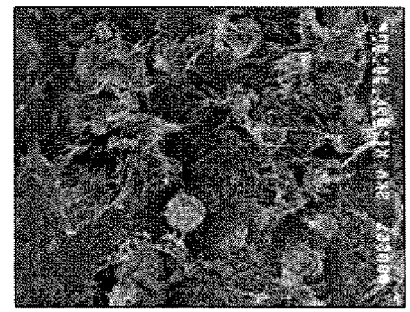
Figure 3G:
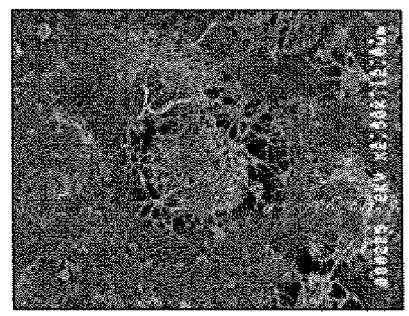
Figure 3H:
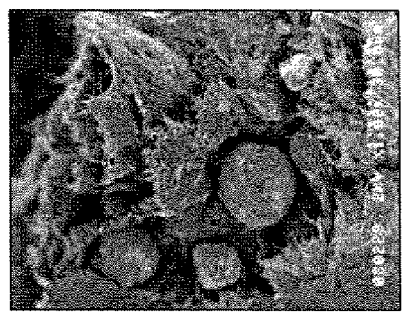

MCMB-SWCNT freestanding carbon nanotube paper was prepared using a gradient of purified SWCNTs followed by a weighted blend of purified SWCNTs with particular mass ratios to the MCMBs (Osaka Gas). The weighted blends (w/w) prepared initially were 90:10, 75:25, and 50:50 with MCMB:SWCNTs, respectively. The MCMBs that were evaluated in the prototype measurement were particles 10-28, although the 6-28, 25-28, and various combinations of these may improve performance. The SWCNTs were dispersed in N,N-dimethylacetamide prior to the addition of the MCMBs. The resulting solution was vacuum filtered over a 0.2 μm teflon filter and the freestanding carbon nanotube paper was easily removed. A representative image of a 1 cm² freestanding electrode from the 75:25 blend is shown in FIG. 2. Scanning electron micrographs of this sample are shown in FIGS. 3A-H. The nested MCMBs are in excellent physical contact with the SWCNTs, which should enhance electrochemical properties.

Electrochemical testing of a 75:25 MCMB-SWCNT freestanding carbon nanotube paper was performed after drying at 200° C. under vacuum for 12 hours. To measure the lithium ion capacity, MCMB-SWCNT papers (each with a mass of ~1 mg) were assembled into a two-electrode electrochemical cell and tested in an argon glove box. Lithium ribbon (380 micron, 99.9% Aldrich) was applied on the opposite stainless electrode from the MCMB-SWCNT paper with an electrolyte-soaked Celgard 2325 spacer in between. The electrolyte was freshly prepared using 1M $LiPF_6$ in a solvent mixture containing a combination of the following solvents (Aldrich): ethylene carbonate, propylene carbonate, and dimethyl carbonate. Galvanostatic cycling occurred at 37 mA/g (equivalent of C/10 for $LiC_6$ where C/t is the complete charge (discharge) in t hours) with an Arbin Instruments BT-2000 at room temperature from 3 V to 5 mV (V vs. $Li/Li^+$).

Figures 4A, 4B:
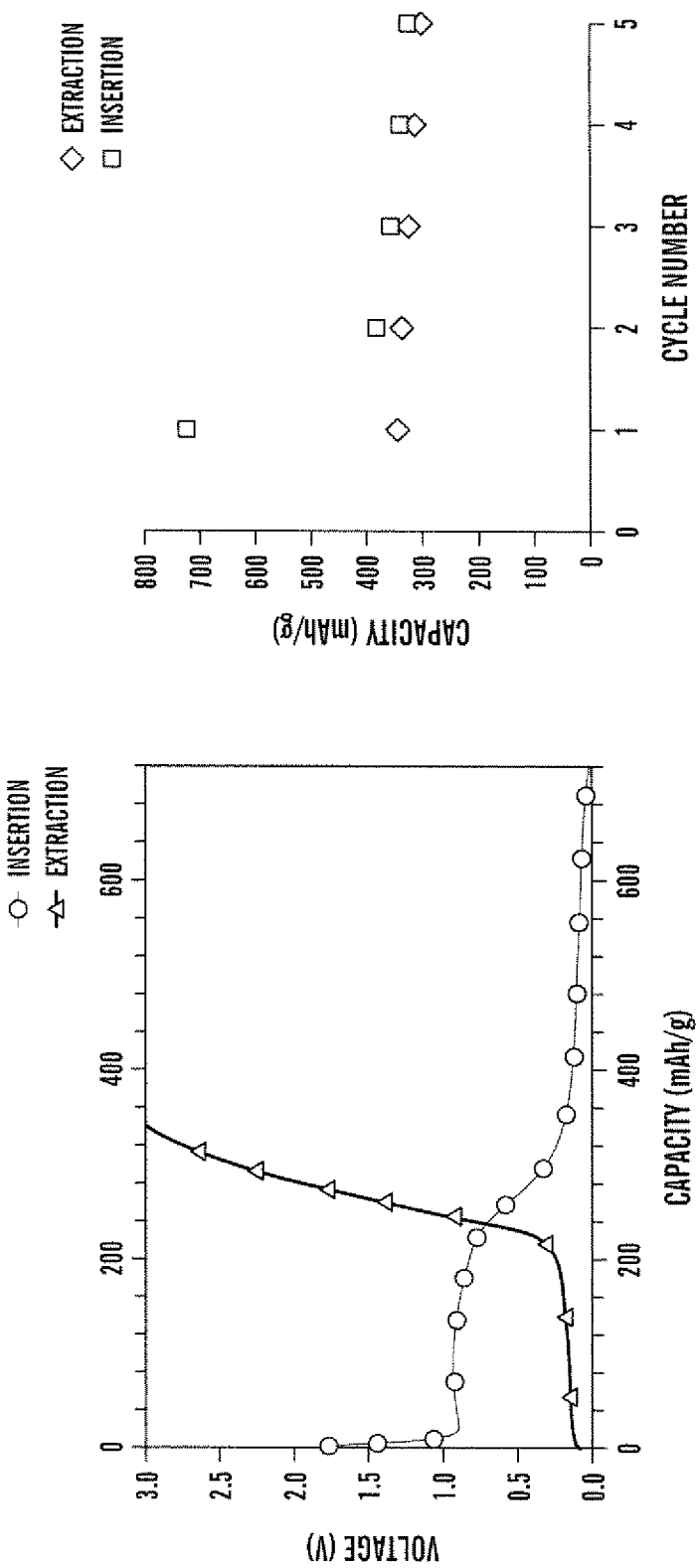
FIGS. 4A-B are graphs showing the first cycle of lithium ion insertion and extraction for a 75:25 MCMB-SWCNT freestanding carbon nanotube paper electrode of the present invention (FIG. 4A) and the reversible capacity of this electrode over the first 5 cycles (FIG. 4B).

FIG. 4A shows the first cycle of lithium ion insertion and extraction for a 75:25 MCMB-SWCNT freestanding carbon nanotube paper electrode according to one embodiment of the present invention. The insertion capacity is 720 mAh/g while the extraction capacity is 340 mAh/g. This coulombic efficiency of ~50% relates to the combined effects of SEI formation on the SWCNTs and the MCMBs. The lithium ion insertion/extraction stages at 0.1-0.25 V is typical of MCMB based anodes. The reversible capacity of this electrode was measured, as shown in FIG. 4B, to maintain >300 mAh/g after five cycles. Thus, the demonstration of a freestanding electrode achieving this capacity, as discussed in relation to FIG. 1, represents at least a 100% improvement in usable anode capacity.

Example 2

Prototype Freestanding MCMB:SWCNT Paper/$LiCoO_2$ Secondary Li-Ion Battery

Figure 5A:
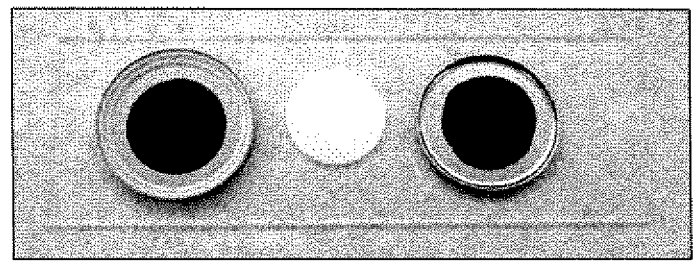
FIGS. 5A-B compare the capacity of a MCMB-SWCNT freestanding electrode of the present invention to the active mass in a MCMB composite used in a traditional full battery.
Figure 5B:
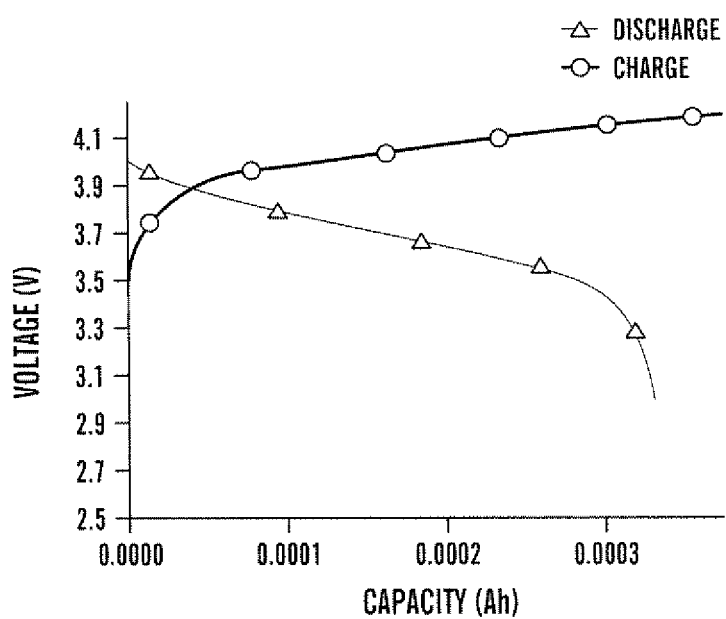

The lithium ion capacity of a MCMB-SWCNT freestanding electrode of the present invention is comparable to the active mass in a MCMB composite used in the traditional full battery. To verify the use of a MCMB-SWCNT freestanding electrode in a full battery, a 2016 coin cell was fabricated using $LiCoO_2$ as the cathode. The cathode was prepared using an 80:10:10 composite mixture of $LiCoO_2$:PVDF:carbon black in NMP. The slurry was solution cast and dried onto the aluminum can. FIG. 5A shows, from left: $LiCoO_2$ PVDF composite on aluminum can with polymer o-ring, Celgard 2325 separator, MCMB-SWCNT electrode paper (binder free) on metal lid. The coin cell was cycled at 50 mA/g with respect to the freestanding anode (2× excess of cathode material). The resulting charge/discharge curve for cycle 1 is shown in FIG. 5B. The result is typical of conventional $LiCoO_2$ batteries with an average voltage of ~3.7 V and the resulting capacity was consistent with the lithium ion measurements of the anode tested independently.

Figure 6:
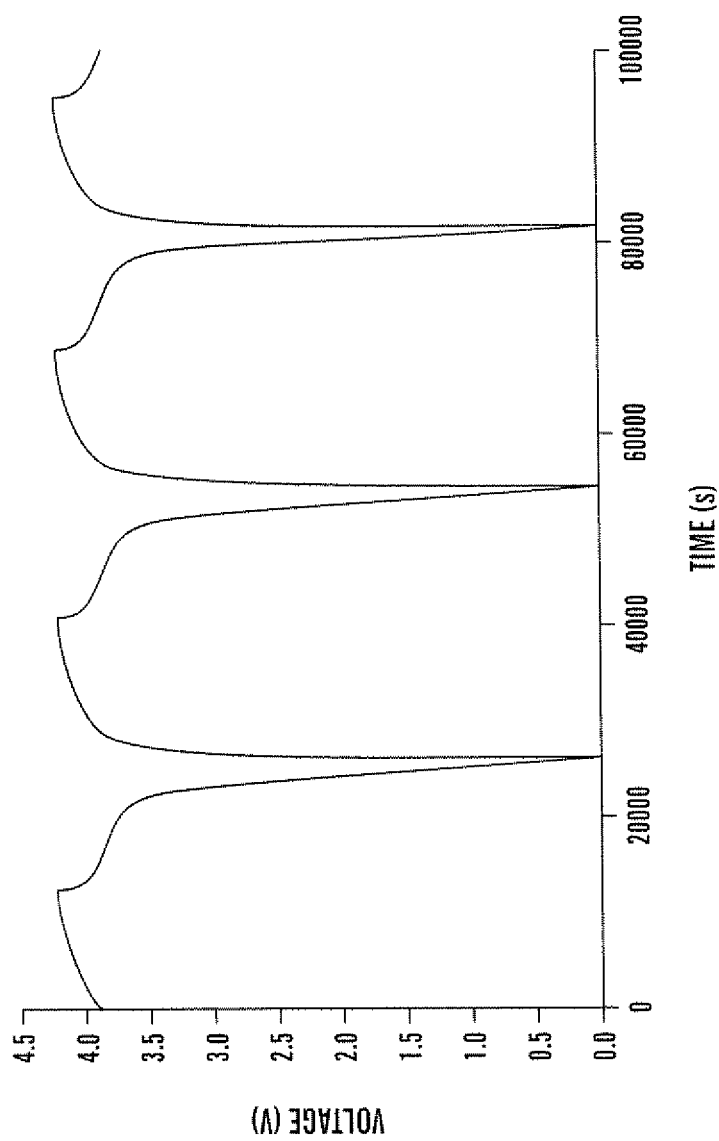
FIG. 6 is a graph showing electrical cycling of a freestanding MCMB:SWCNT/$LiCoO_2$ secondary Li-ion battery with deep discharging to 0.005V.

An additional advantage to the capacity improvements of the MCMB-SWCNT freestanding electrode compared to conventional lithium ion batteries is the absence of copper foil on the anode side. If the battery voltage is over-discharged below 2.5 V, the copper can dissolve and degrade the performance of the battery (Hossain et al., "Carbon-carbon Composite as Anodes for Lithium-ion Battery Systems," J. Power Sources 96:5-13 (2001), which is hereby incorporated by reference in its entirety). The MCMB-SWCNT freestanding electrode can be fully discharged and maintain cycleability as shown in FIG. 6. This can allow for zero volt state of charge during storage as well as minimize the necessary power management circuitry when integrating complete lithium ion batteries into certain power systems.

Example 3

Freestanding MCMB-MWCNT Paper

Figure 7B:
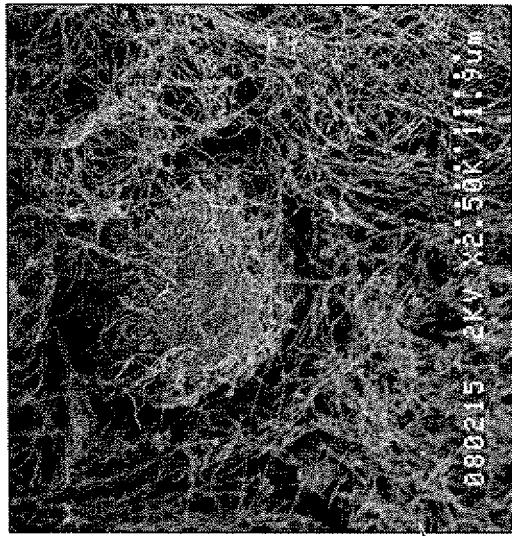
FIGS. 7A-B are scanning electron micrograph images of a freestanding carbon nanotube paper according to one embodiment of the present invention with a 50:50 (MCMB:multiwall carbon nanotube ("MWCNT")) mass ratio.
Figure 7A:
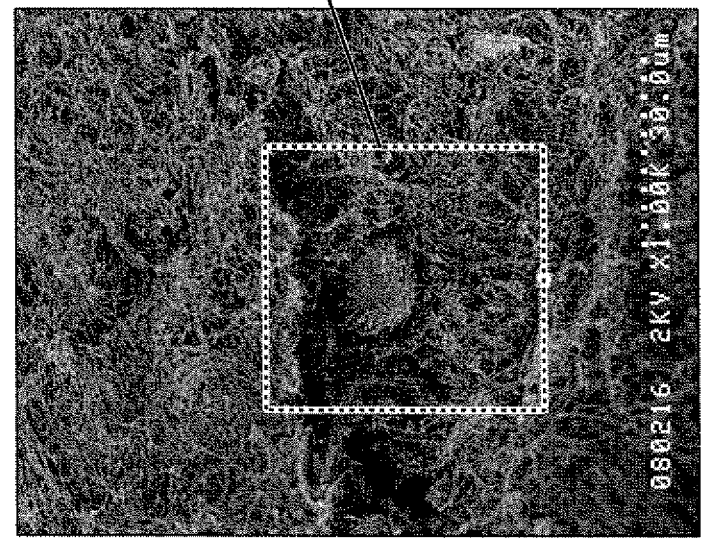

MCMB-MWCNT freestanding carbon nanotube paper was prepared using MWCNTs with a 50:50 mass ratio to the MCMBs (Osaka Gas). The MCMBs that were evaluated in the prototype measurement were particles 10-28, although the 6-28, 25-28, and various combinations of these may improve performance. Scanning electron micrographs of this sample are shown in FIGS. 7A-B. The nested MCMBs are in excellent physical contact with the MWCNTs, which should enhance electrochemical properties.

Figure 8A:
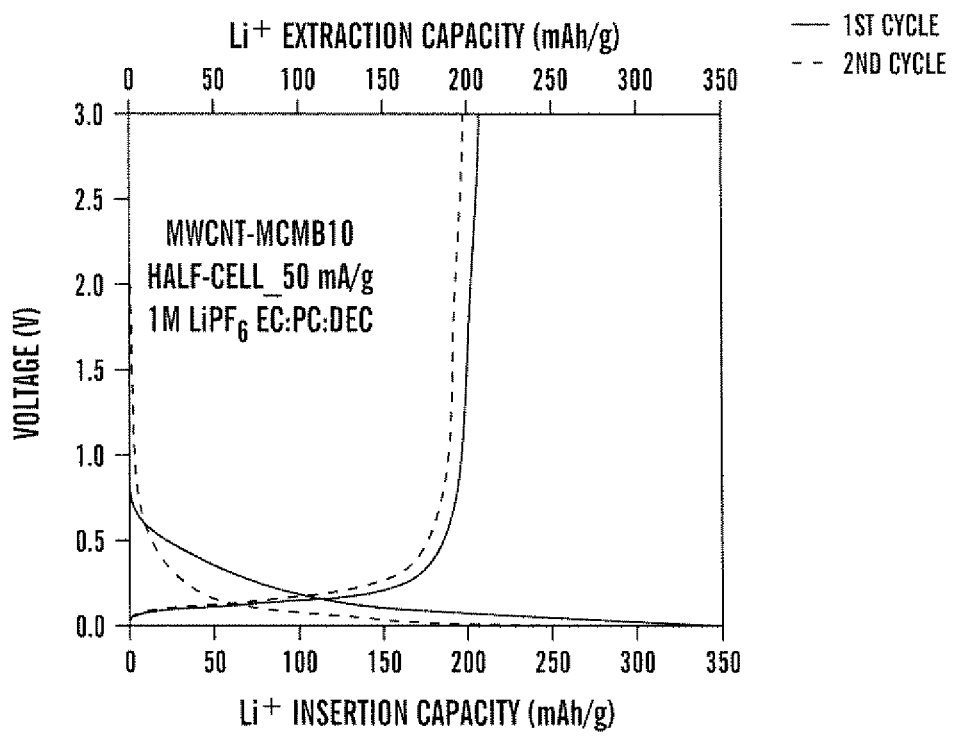
FIGS. 8A-B are graphs showing the first cycle of lithium ion insertion and extraction for a 50:50 MCMB-MWCNT freestanding carbon nanotube paper electrode of the present invention (FIG. 8A) and the reversible capacity of this electrode over the first 20 cycles (FIG. 8B). A comparison between electrolyte solvents is shown for dimethylcarbonate (DMC), diethylcarbonate (DEC), and dipropylcarbonate (DPC).
Figure 8B:
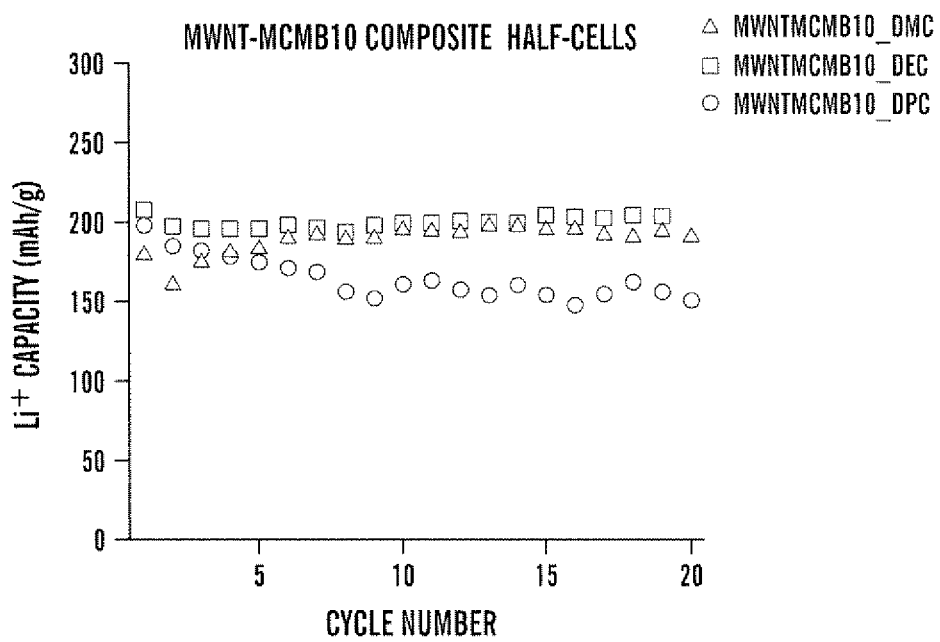

FIG. 8A shows the first cycle of lithium ion insertion and extraction for a 50:50 MCMB-MWCNT freestanding carbon nanotube paper electrode according to one embodiment of the present invention. The insertion capacity is 350 mAh/g while the extraction capacity is 210 mAh/g. This coulombic efficiency of 60% relates to the combined effects of SEI formation on the MWCNTs and the MCMBs. The lithium ion insertion/extraction stages at 0.1-0.25 V is typical of MCMB based anodes. The reversible capacity of this electrode was measured, as shown in FIG. 8B for three different electrolyte combinations, to maintain ~200 mAh/g after twenty cycles. Thus, the demonstration of a freestanding electrode achieving higher useable capacity, as discussed in relation to FIG. 1, represents an improvement to conventional lithium ion battery technology.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A freestanding carbon nanotube electrode comprising:
   purified single wall carbon nanotubes, wherein the purified single wall carbon nanotubes form a freestanding carbon nanotube paper and
   graphitic carbon microparticles present on a surface of the freestanding carbon nanotube paper, wherein the freestanding carbon nanotube electrode exhibits a specific extraction capacity is greater than 150 milliamp-hours per gram of electrode at a voltage less than or equal to 1 volt verses Li/Li$^+$.

2. The carbon nanotube electrode according to claim 1, further comprising:
   carbon microparticles embedded in the freestanding carbon nanotube paper.

3. The carbon nanotube electrode according to claim 1, wherein the purified single wall carbon nanotubes wrap the graphitic carbon microparticles to form the freestanding carbon nanotube paper.

4. The carbon nanotube electrode according to claim 1, wherein the graphitic carbon microparticles are selected from graphite, flake graphite, spherical graphite, expanded graphite, and mesocarbon microbeads.

5. The carbon nanotube electrode according to claim 4, wherein the graphitic carbon microparticles have a diameter of about 1-50 μm.

6. The carbon nanotube electrode according to claim 1, wherein the freestanding carbon nanotube paper has a density of less than about 1.5 g/cm$^3$.

7. The carbon nanotube electrode according to claim 1, wherein the freestanding carbon nanotube paper has a thermal stability that exceeds at least about 600° C.

8. The carbon nanotube electrode according to claim 1, further comprising:
   semiconductor nanoparticles present with the purified single wall carbon nanotubes and the graphitic carbon microparticles.

9. The carbon nanotube electrode according to claim 8, wherein the nanoparticles are selected from compositions containing Si, Ge, GaSb, InSb, SnSe, SnTe, GaP, GaAs, InAs, $TiO_2$, InP, AlP, AlAs, ZnTe, CdSe, CdTe, and mixtures or alloys thereof.

10. A lithium ion battery comprising the freestanding carbon nanotube electrode according to claim 1 as at least one electrode in the lithium ion battery.

11. The lithium ion battery according to claim 10, wherein the battery comprises a liquid electrolyte material.

12. The lithium ion battery according to claim 11, wherein the liquid electrolyte comprises an ionic liquid.

13. The lithium ion battery according to claim 12, wherein the ionic liquid is selected from 1-R-3-R'-imidazolium tetrafluoroborate, 1-R-3-R'-imidazolium hexafluorophosphate, 1-R-1-R'-pyrrolidinium bis(trifluoromethylsulfonyl)imide, and 1-R-3-R'-imidazolium bis(trifluoromethylsulfonyl)imide.

14. The lithium ion battery according to claim 10, wherein the battery comprises a solid electrolyte material.

15. The lithium ion battery according to claim 14, wherein the electrolyte is a polymer.

16. The lithium ion battery according to claim 10, wherein the battery is functional at temperatures equal to that of the thermal stability of the carbon nanotube paper.

17. A capacitor, supercapacitor, or battery/capacitor comprising the carbon nanotube electrode according to claim 1 as at least one electrode in the capacitor, supercapacitor, or battery/capacitor.

18. A fuel cell comprising the carbon nanotube electrode according to claim 1, wherein the freestanding carbon nanotube electrode is present as at least one catalyst layer in the fuel cell.

19. A method of making a freestanding carbon nanotube electrode, said method comprising:
   providing purified single wall carbon nanotubes;
   contacting the purified single wall carbon nanotubes with an organic solvent under conditions effective to form a dispersion comprising the purified single wall carbon nanotubes;
   forming the dispersion into a freestanding carbon nanotube paper; and
   incorporating graphitic carbon microparticles with the purified single wall carbon nanotubes, wherein the freestanding carbon nanotube electrode exhibits a specific extraction capacity greater than 150 milliamp-hours per gram of electrode at a voltage less than or equal to 1 volt verses Li/Li$^+$.

20. The method according to claim 19, wherein said incorporating is carried out by introducing the carbon microparticles into the dispersion prior to said forming.

21. The method according to claim 19, wherein said incorporating is carried out after said forming by introducing the carbon microparticles into or onto the carbon nanotube paper.

22. The method according to claim 19, wherein said forming the dispersion is carried out by membrane filtration using a vacuum or pressurized system.

23. The method according to claim 19 further comprising drying the formed structure.

24. The method according to claim 19, wherein the carbon microparticles are selected from graphite, flake graphite, spherical graphite, expanded graphite, and mesocarbon microbeads.

25. The method according to claim 24, wherein the carbon microparticles have a diameter of about 1-50 µm.

26. The method according to claim 19 further comprising:
incorporating semiconductor nanoparticles into the dispersion or nanotube paper.

27. A conducting wire or ribbon comprising the freestanding carbon nanotube electrode according to claim 1.

* * * * *